(12) United States Patent
Myers et al.

(10) Patent No.: US 7,546,665 B2
(45) Date of Patent: Jun. 16, 2009

(54) CINCH FOR TETHER

(75) Inventors: Doyle R. Myers, North Vernon, IN (US);
Trevor S. Brown, Salem, IN (US); Eric Christopher Kerkhof, Columbus, IN (US)

(73) Assignee: Doyle's Deer Gear, North Vernon, IN (US)

( * ) Notice: Subject to any disclaimer, the term of this patent is extended or adjusted under 35 U.S.C. 154(b) by 541 days.

(21) Appl. No.: 11/194,212

(22) Filed: Aug. 1, 2005

(65) Prior Publication Data
US 2006/0021199 A1    Feb. 2, 2006

Related U.S. Application Data

(60) Provisional application No. 60/592,555, filed on Jul. 30, 2004.

(51) Int. Cl.
*F16G 11/00* (2006.01)

(52) U.S. Cl. .................... 24/136 R; 24/115 R

(58) Field of Classification Search ............... 24/115 K, 24/115 M, 136 K, 136 L, 136 R
See application file for complete search history.

(56) References Cited

U.S. PATENT DOCUMENTS

| | | | |
|---|---|---|---|
| 1,023,706 A * | 4/1912 | Anderson | 24/136 L |
| 2,443,335 A * | 6/1948 | Vogel | 24/136 L |
| 2,902,736 A * | 9/1959 | Hampe | 24/136 R |
| 3,960,461 A * | 6/1976 | Sachs | 24/136 L |
| 4,112,551 A * | 9/1978 | Sales | 24/136 L |
| 4,455,717 A * | 6/1984 | Gray | 24/115 R |
| 4,782,560 A * | 11/1988 | Keller | 24/136 L |
| 4,807,333 A * | 2/1989 | Boden | 24/136 R |
| 4,815,174 A * | 3/1989 | Sou | 24/136 R |
| 5,335,400 A * | 8/1994 | Sales | 24/712.5 |
| 5,383,905 A * | 1/1995 | Golds et al. | 24/136 L |
| 5,902,321 A * | 5/1999 | Caspari et al. | 606/232 |
| 5,971,139 A * | 10/1999 | Bradley | 206/217 |
| 6,074,124 A * | 6/2000 | Scarr | 24/136 R |
| 6,094,784 A * | 8/2000 | Schrader | 24/136 R |
| 6,126,677 A * | 10/2000 | Ganaja et al. | 606/232 |
| 6,308,383 B1 * | 10/2001 | Schrader | 24/136 R |
| 6,948,216 B2 * | 9/2005 | Gaudyn et al. | 24/115 R |
| 7,048,755 B2 * | 5/2006 | Bonutti et al. | 24/136 R |

* cited by examiner

*Primary Examiner*—Robert J Sandy
*Assistant Examiner*—Ruth C Rodriguez
(74) *Attorney, Agent, or Firm*—Woodard, Emhardt, Moriarty, McNett & Henry LLP

(57) ABSTRACT

A cinch for a tether used to elevate equipment in the field. An element having a tapered section connects with either a rope or strap. The element is removably received in a receptacle through which the tether has been passed. The receptacle has a side notch to facilitate looping the tether around the equipment. The cinch can be manipulated in the dark.

12 Claims, 4 Drawing Sheets

CINCH FOR TETHER

REFERENCE TO RELATED APPLICATIONS

This application claims the benefit of Provisional Patent Application Ser. No. 60/592,555, filed Jul. 30, 2004, which is hereby incorporated by reference in its entirety.

FIELD OF THE INVENTION

The present invention relates to tethers and more specifically for cinches incorporated in tethers used to lift equipment in "the field."

BACKGROUND OF THE INVENTION

Tethers have been used for lifting outdoor equipment to an elevated position so as to facilitate the safety and security of a person ascending to an elevated platform. This enables an individual to secure themselves in an observation platform and then lift outdoor equipment to their station whether it be camera apparatus or hunting equipment. Rope is commonly used for this purpose and is used to wrap around an eyelet or other lifting hook on a device where it is knotted and the device allowed to be lifted to the elevated position. One of the problems with such an arrangement is that it requires a knot to secure the device. In practice, this may be more or less difficult to undo once the equipment is in the elevated position.

This has been solved in some ways by having a releasable hook so that the end of the device with the hook is extended through a lifting eye or crook of an apparatus or equipment and then hooked back onto the rope to place it in readiness for lifting. Again, this has limitations since the hook places a limitation on the minimum size of the loop and can be difficult to engage and disengage, especially in the dark or with gloved hands.

Another use for tethers of this is to lift equipment to an elevated position by a home owner or workman performing work on an elevated structure such as painting, cleaning gutters, repairing portions of a building. It is advantageous for safety reasons to ascend to the elevated position and then once in place lift the tools or receptacle to the elevated position. With both applications, the existing hook leaves much to be desired for safe and effective tethering of the object to be lifted.

SUMMARY

The present invention relates to an element affixed to the end of a tether in a strap or a rope form and suitable to pass through a lifting eye or other appropriate location on equipment and then received in a recess in a receptacle for the element having the tether extending through it to form the tether in a loop. The element is constructed in such a way that it can be inserted in the side of the receptacle to achieve the loop.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
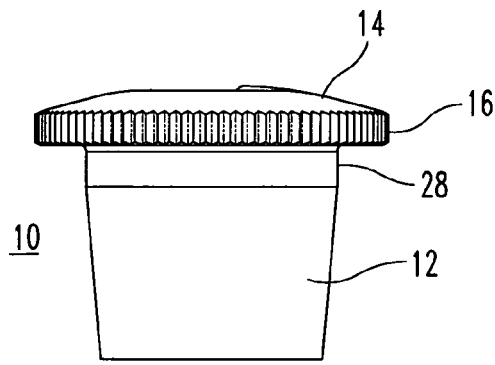
FIG. 1 shows a side view of an element usable in the present invention.
Figure 2:
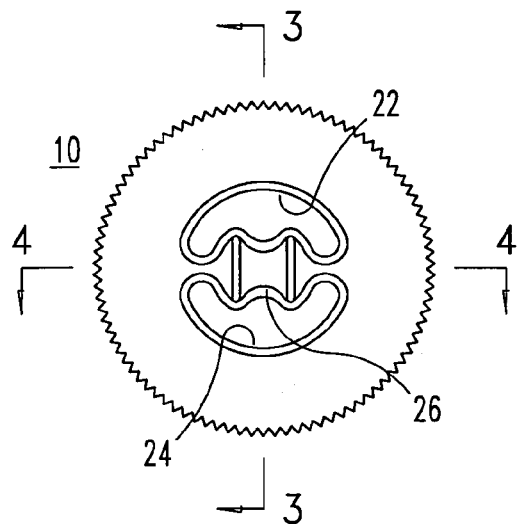
FIG. 2 shows a top view of the element of FIG. 1.
Figure 3:
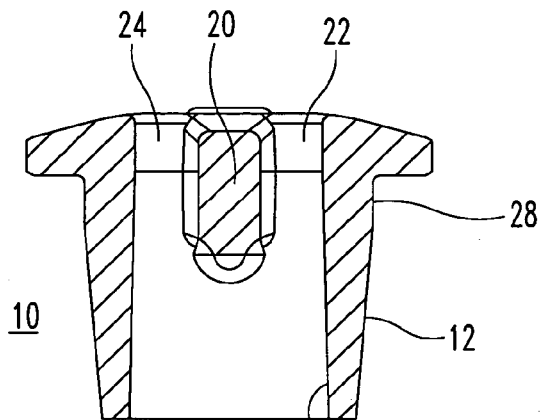
FIG. 3 is a section view taken on lines 3-3 of FIG. 2.
Figure 4:
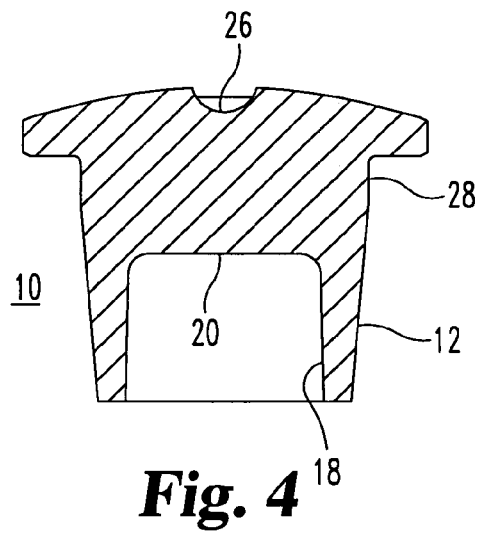
FIG. 4 is a section view taken on lines 4-4 of FIG. 2.

Referring now to FIG. 1, an element 10 for the cinch comprises a tapered tubular section 12 extending from a flange 14 that has serrations 16 around its circumference for facilitating operator manipulation. Referring particularly to FIG. 2 through FIG. 4, the element 10 has as a central passage 18 divided by a bridge 20 as particularly shown in FIG. 3 and FIG. 4. Bridge 20 provides openings 22 and 24 shown in FIG. 2 and FIG. 3. Bridge 20 has a circular recess 26 providing a guide for a rope-like tether to be described later. As particularly shown in FIG. 2, openings 22 and 24 are crescent in shape so as to facilitate passage of a strap, also as described later. The tapered exterior 12 of element 10 has a cylindrical section 28 adjacent flange 14 to provide a locking function as described below.

Figure 5:
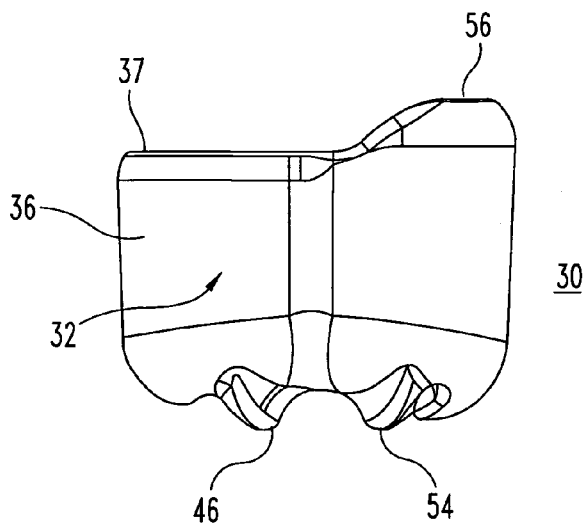
FIG. 5 shows a side view of a receptacle for the element of FIG. 1
Figure 6:
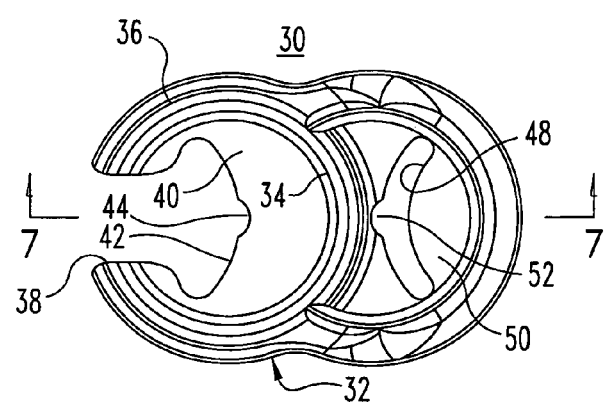
FIG. 6 shows a top view of the receptacle of FIG. 5.
Figure 7:
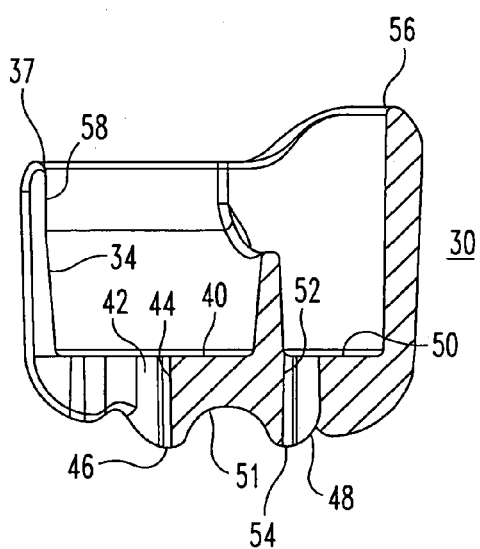
FIG. 7 is a section view taken on lines 7-7 of FIG. 6.
Figure 8:
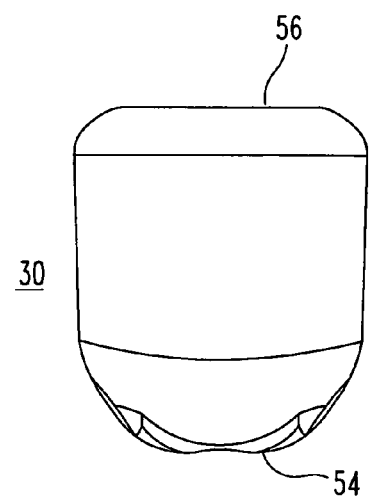
FIG. 8 shows an end view of the receptacle of FIG. 5.

FIGS. 5-8 illustrate a receptacle 30 comprising an outer housing 32 having an annular recess 34 for receiving element 10. Referring particularly to FIGS. 6 and 7, the housing 32 of receptacle 30 comprises a generally annular section 36 having an opening or slot 38. Annular section 36 has a floor 40 with a semicircular edge 42 extending to slot 38. In addition, a central semicircular notch 44 is provided for guiding a rope-like tether described below. A first lip 46 extends downward as shown in FIG. 5 and FIG. 7 from semicircular edge 42. A passage 48 is formed in a lower floor 50 of receptacle 30 and has a crescent shape as particularly shown in FIG. 6. Passage 48 additionally has a semicircular central notch 52 for guiding a rope-like tether as described later. A lip 54, spaced from, and corresponding to lip 46 facilitates a looping function as described below. The upper edge 37 of annular section 36 is lower than the top 56 of receptacle 30 so as to receive the flange 14 of element 10 in a compact configuration. Recess 34 has a cylindrical section 58 adjacent the upper edge 37 to interact with the cylindrical section 28 on element 10 to hold element 10 in place.

As shown particularly in FIG. 6, crescent shaped passage 48 co-operates with semicircular edge 42 to have their midpoints closest to one another and their ends further apart. It should also be noted the semicircular notches 44 and 52 are at the midpoint to guide a rope-like tether to loop with a minimum radius defined by a semicircular recess 51 between lips 46 and 54.

Figure 9:
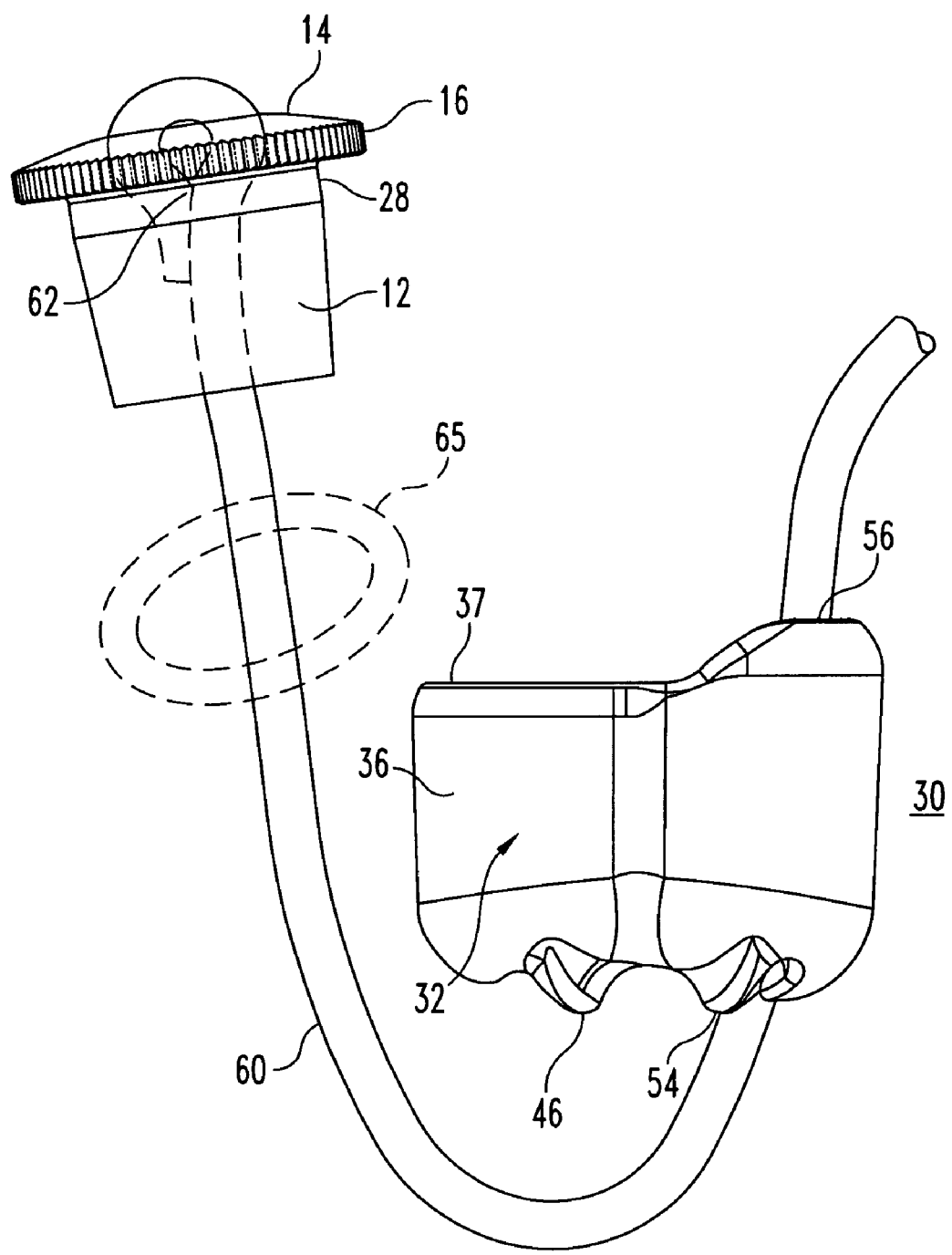
FIG. 9 shows the element of FIG. 1 ready for insertion in the receptacle of FIG. 5.

The components are designed to be interconnected as shown in FIG. 9 through FIG. 13. In FIG. 9, the element 10 is about to be inserted into recess 34 of receptacle 30 and in FIG. 10 the element 10 is fully inserted. As is apparent from FIG. 11 and FIG. 12, the element 10 and receptacle 30 make for a compact assembly with the serrations 16 of flange sticking sufficiently out so as to enable tactile determination, without looking at the device, that the element 10 is either in place or not in place.

Figure 10:
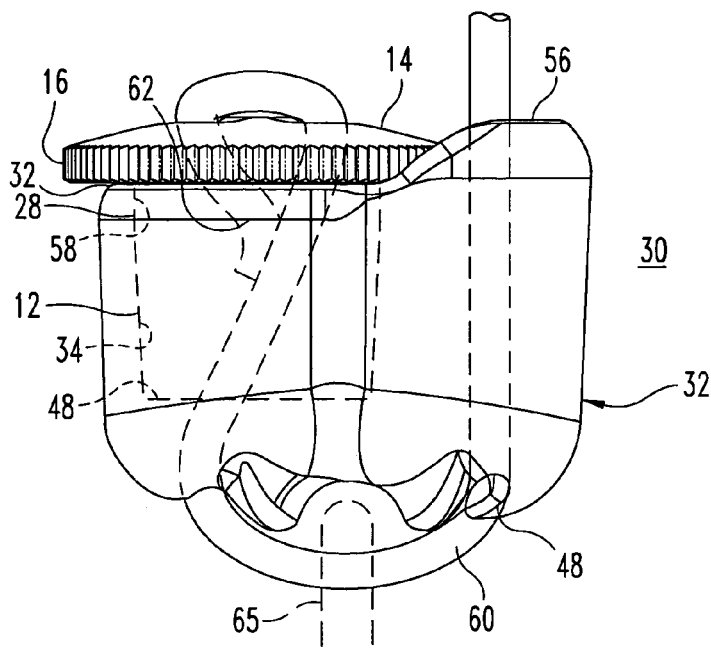
FIG. 10 shows a side view of the element of FIG. 1 in place in the receptacle of FIG. 5 with a tether extending through a loop.
Figure 11:
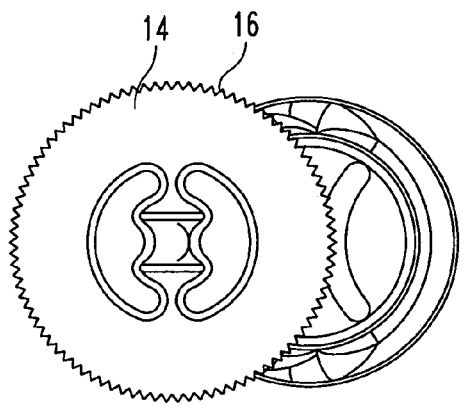
FIG. 11 shows a top view of the element of FIG. 1 in place in the receptacle of FIG. 5 without a tether.
Figure 12:
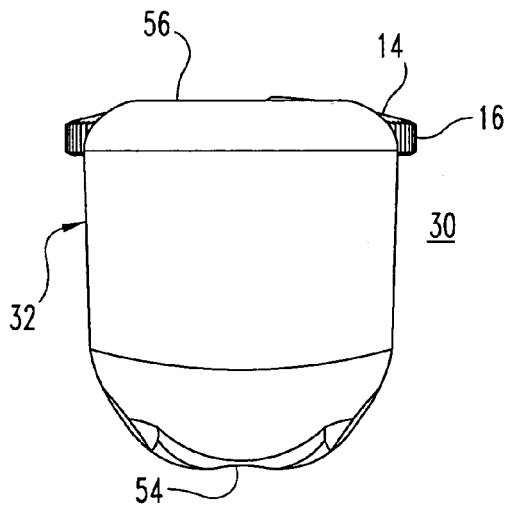
FIG. 12 shows an end view of the element of FIG. 1 in place in the receptacle of FIG. 5 without a tether.

FIG. 9 and FIG. 10 show the apparatus utilized with a rope-like tether 60 interconnected with element 10 by passing the tether 60 through one of the passages 22 and 24 from interior passage 18 and back into it through the opposite passage. An appropriate knot 62 ensures that the tether 60 will be held in place. The tether 60 is then passed through crescent shaped passage 48 in receptacle 30 and the rope-like tether 60 is guided by semicircular central notch 52 (see FIG. 6). As shown in FIG. 9, with the element 10 out of the receptacle 30, the tether 60 may be extended around the object to be lifted, whether it be a gun stock or camera or holding loop of the equipment represented by dashed line 65.

It should be noted to those skilled in the art that the tether 60 may extend around the entire outer circumference of an object to be lifted and securely hold the object, since the tether can extend as long as is necessary to wrap around the object. In contrast, the tether can also extend around a holding loop with a relatively small diameter as represented by phantom lines 65. Because of notch 38, element 10 is easily removable from recess 34 so as to permit extension through a closed opening as represented by phantom lines 65. This greatly facilitates the interconnection between the tether and the object to be lifted.

The element 10 is then inserted into the recess 34 as shown in FIG. 10 to complete the loop. In position, the element 10 adds structural integrity to the receptacle 30 as an assembly and ensures that all the force is transferred to the tether 60. In addition, the co-operation between the cylindrical sections 28 and 58 on the element 10 and receptacle 30, respectively assist in maintaining the element 10 and receptacle together. The tether 60 is then free to move through passage 48 and particularly the semicircular notch 52 to adjust the size of the loop 64 to conform to the size of the object to be lifted. It should be noted that because of the close proximity of lips 46 and 54, a very small loop size can be accommodated. The size is significantly smaller than the loops provided in devices, which rely on hooks or wire loops as shown by phantom line 65.

Figure 13:
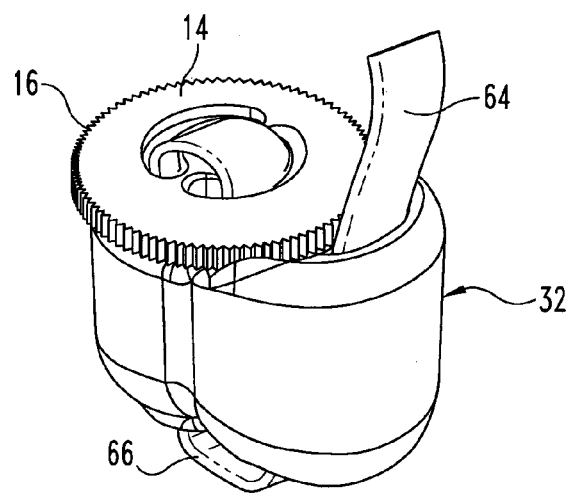
FIG. 13 shows the element of FIG. 1 in position in the receptacle of FIG. 5 to form a loop tether formed from a strap.

The element 10 and receptacle 30 are also adaptable to the strap 64 shown in FIG. 13. Strap 64 extends up through passage 18 through one of openings 22 and 24 and loops down and is knotted. It should be noted that the crescent shape of openings 22 and 24 shown in FIG. 2 facilitates the fabrication of the loop. The strap 64 then is extended through passage 48 of receptacle 30. Again, it should be noted that the crescent shape to passage 48 shown in FIG. 7 promotes the formation of a loop and a cross-section curvature to strap 64 that facilitates contact with the equipment to be lifted. When strap 64 is put in position around the object to be lifted, the element 10 is inserted into recess 34 past slot 38. The strap 64 is slightly turned so that its edges abut the outer ends of edge 42. A loop 66 is then formed as shown in FIG. 13. This makes the loop highly secure and permits adjustment of the strap 64 to accommodate the size of the object to be lifted.

It should be noted that the cinch of the present invention can be manipulated in the dark without an operator seeing the device, since the serrations 16 on the element 10 extend beyond receptacle 30 and give a tactile indication of its position on the receptacle 30. In addition, the device can be manipulated with gloved hands which is particularly useful in winter weather. The element 10 and receptacle 30 may be made from luminescent materials if it is desired to observe the device at night.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cinch for a tether used to engage an object, said cinch comprising:

a receptacle having a passage forming a path for receiving the tether in a loop, and an element connectable to one end of the tether with said element having a central passage to receive the tether within the central passage, said receptacle having a recess intersecting said path, said receptacle having a side with a slot extending through said side and opening into said passage, said element being received in said recess and removable from said receptacle with the tether moving through said slot to open the loop of the tether thereby permitting it to extend through an enclosed opening on the object or around the object with the tether being movable back through said slot to close said loop; and wherein said element is tapered and said recess is correspondingly tapered to receive said element; and wherein said element and said recess are frustroconical.

2. A cinch for a tether used to engage an object, said cinch comprising:

a receptacle having a passage forming a path for receiving the tether in a loop, and an element connectable to one end of the tether, said receptacle having a recess intersecting said path, said receptacle having a side with a slot extending through said side and opening into said passage, said element being received in said recess and removable from said receptacle with the tether moving though said slot to open the loop of the tether thereby permitting it to extend through an enclosed opening on the object or around the object with the tether being movable back though said slot to close said loop; and wherein said element is tapered and said recess is correspondingly tapered to receive said element; and wherein said element has a flange extending outward from the upper portion of said recess when said element is in place in said recess; and wherein said flange has serrations about its circumference.

3. A cinch as claimed in claim 2 wherein said element is frustroconical with the largest diameter immediately adjacent said flange and said recess has a corresponding frustroconical shape.

4. A cinch as claimed in claim 3 wherein said element has a cylindrical section between said frustroconical shape and said flange, said recess having a corresponding cylindrical section extending from its frustroconical section.

5. A cinch for a tether used to engage an object, said cinch comprising:

a receptacle having a passage forming a path for receiving the tether in a loop, and an element connectable to one end of the tether with said element having a central passage to receive the tether within the central passage, said receptacle having a recess intersecting said path, said receptacle having a side with a slot extending though said side and opening into said passage, said element being received in said recess and removable from said receptacle with the tether moving through said slot to open the loop of the tether thereby permitting it to extend through an enclosed opening on the object or around the object with the tether being movable back through said slot to close said loop; and wherein at least a portion of said path for receiving the tether is elongated in cross-section; and wherein a cross-sectional shape of at least a portion of said path is semi-circular; and wherein said path has a notch in the center of said semi-circular shape for permitting said tether to be in a rope like shape or a strap.

6. A cinch for a tether used to engage an object, said cinch comprising:

a receptacle having a passage forming a path for receiving the tether in a loop, and an element connectable to one end of the tether, said receptacle having a recess intersecting said path, said receptacle having a side with a slot extending through said side and opening into said passage, said element being received in said recess and removable from said receptacle with the tether moving through said slot to open the loop of the tether thereby permitting it to extend through an enclosed opening on the object or around the object with the tether being movable back through said slot to close said loop; and wherein the path for receiving the tether in said receptacle comprises two adjacent passages each having a semi-circular cross-sectional shape and curved in a manner so that the center of the adjacent passages are closest to one another; and wherein said passages have a notch in the center for guiding a rope like tether through said passages.

7. A cinch for a tether used to engage an object, said cinch comprising:

a receptacle having a passage forming a path for receiving the tether in a loop, and an element connectable to one end of the tether, said receptacle having a recess intersecting said path, said receptacle having a side with a slot extending through said side and opening into said passage, said element being received in said recess and removable from said receptacle with the tether moving through said slot to open the loop of the tether thereby permitting it to extend through an enclosed opening on the object or around the object with the tether being movable back through said slot to close said loop; and wherein said element has a central passage and a bridge dividing said passage into adjacent openings, whereby said bridge is used to tie the tether.

8. A cinch as claimed in claim 7 wherein said openings have a crescent cross-sectional configuration.

9. A cinch as claimed in claim 8 wherein the ends of said adjacent openings are closest to one another.

10. A cinch as claimed in claim 9 wherein said bridge has a central circular recess for guiding a rope like tether, said crescent shaped openings being used to guide a strap like tether.

11. A cinch for a tether used to engage an object, said cinch comprising:

a receptacle having a path for receiving the tether in a loop, and an element connectable to one end of the tether, said receptacle having a recess intersecting said path, said element being received in said recess and removable from said receptacle to open the loop of the tether thereby permitting it to extend through an enclosed opening on the object or around the object; and wherein:

said element has a central passage and a bridge dividing said passage into adjacent openings, whereby said bridge is used to tie the tether, said openings have a crescent cross-sectional configuration, the ends of said adjacent openings are closest to one another, said bridge has a central circular recess for guiding a rope like tether, said crescent shaped openings being used to guide a strap like tether; and, further comprising a rope like tether tied around said central circular recess and extending through said path.

12. A cinch as claimed in claim 10 further comprising a strap like tether tied around said bridge and guided by said crescent shaped openings.

* * * * *